(12) United States Patent
Trionfetti

(10) Patent No.: US 6,579,047 B2
(45) Date of Patent: Jun. 17, 2003

(54) GUIDE AND SUPPORT DEVICE FOR SMALL MACHINE TOOLS, IN PARTICULAR FOR ROTATING-MASS BALANCING MACHINES

(75) Inventor: Gianni Trionfetti, Agrate Brianza (IT)

(73) Assignee: Balance Systems S.p.A., Milan (IT)

( * ) Notice: Subject to any disclaimer, the term of this patent is extended or adjusted under 35 U.S.C. 154(b) by 89 days.

(21) Appl. No.: 09/774,101

(22) Filed: Jan. 31, 2001

(65) Prior Publication Data

US 2001/0012478 A1 Aug. 9, 2001

(30) Foreign Application Priority Data

Jan. 31, 2000 (IT) .................................. MI20000053 U

(51) Int. Cl.⁷ .............................. B23C 1/00; B23Q 5/52; B23B 25/00
(52) U.S. Cl. ..................... 409/206; 409/238; 409/239; 267/160; 267/48; 248/581; 82/1.5; 82/163; 82/904; 82/12
(58) Field of Search ............................... 409/206, 238, 409/239, 219; 267/160, 158, 48, 234, 242; 248/581, 678, 622, 599, 580, 618; 82/1.5, 163, 162, 137, 158, 12, 904; 451/157, 125, 124, 160

(56) References Cited

U.S. PATENT DOCUMENTS

| | | | | |
|---|---|---|---|---|
| 2,751,262 A | * | 6/1956 | Federn et al. ............... | 267/160 |
| 3,361,018 A | | 1/1968 | Druckman | |
| 4,433,833 A | * | 2/1984 | Tabe et al. .................... | 267/48 |
| 4,607,461 A | * | 8/1986 | Adams ........................ | 82/1.11 |
| 4,646,595 A | | 3/1987 | Slee | |
| 4,646,596 A | | 3/1987 | Edwards et al. | |
| 4,864,904 A | * | 9/1989 | Mishiro ....................... | 82/137 |
| 5,163,789 A | * | 11/1992 | Weber et al. ................ | 408/27 |
| 5,718,154 A | | 2/1998 | Council, Jr. | |
| 5,757,159 A | * | 5/1998 | Boyette et al. ................ | 82/11 |
| 5,767,981 A | * | 6/1998 | Fraser et al. ................ | 409/234 |
| 5,920,973 A | * | 7/1999 | Kosmowski ................ | 29/26 A |
| 6,325,576 B1 | * | 12/2001 | Kosmowski ................ | 409/238 |

FOREIGN PATENT DOCUMENTS

| | | |
|---|---|---|
| EP | 0 244 012 A1 | 11/1987 |
| JP | 4-315543 A * | 11/1992 |

OTHER PUBLICATIONS

IBM Technical Disclosure Bulletin, "Frictionless X, Y, Z and Theta Micropositioning Table", vol. 15, Issue No. 12, pp. 3889–3890.*

Marks' Standard Handbook for Mechanical Engineers, 9$^{th}$ ed., 1987, McGraw Hill, Inc., pp. 8–3 through 8–7.*

* cited by examiner

Primary Examiner—A. L. Wellington
Assistant Examiner—Erica E Cadugan
(74) Attorney, Agent, or Firm—Browdy and Neimark, P.L.L.C.

(57) ABSTRACT

It is provided a support and guide device for small machine tools, in particular for rotating-mass balancing machines, comprising: a base element (2), at least one moving element (3) in engagement with the base element (2), support elements (4) for the moving element (3), and drive members (5) controlling shiftings of the moving element (3), the support elements (4) comprising at least one elastically deformable thin sheet (7) oscillatably supporting the moving element (3), and the drive members (5) being active on the moving element (3) to shaft the latter against the action of the elastically deformable thin sheet (7).

7 Claims, 3 Drawing Sheets

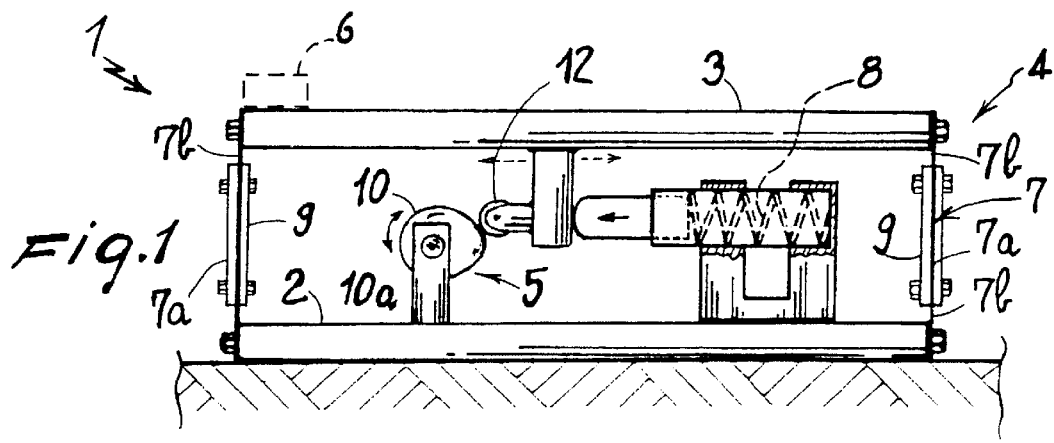
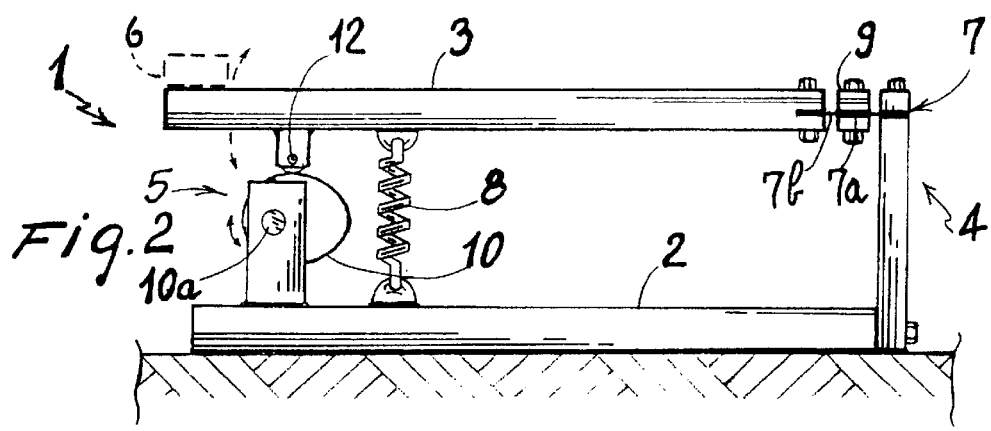
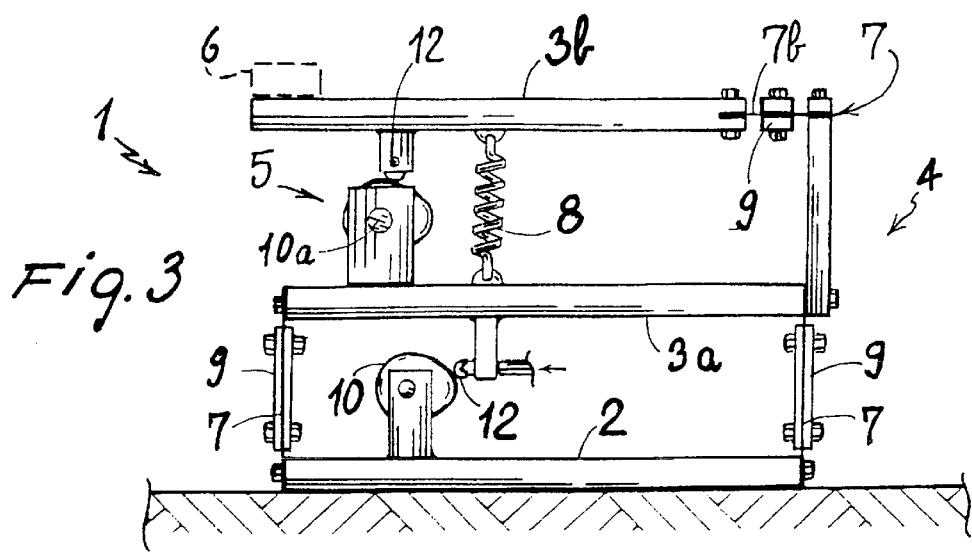

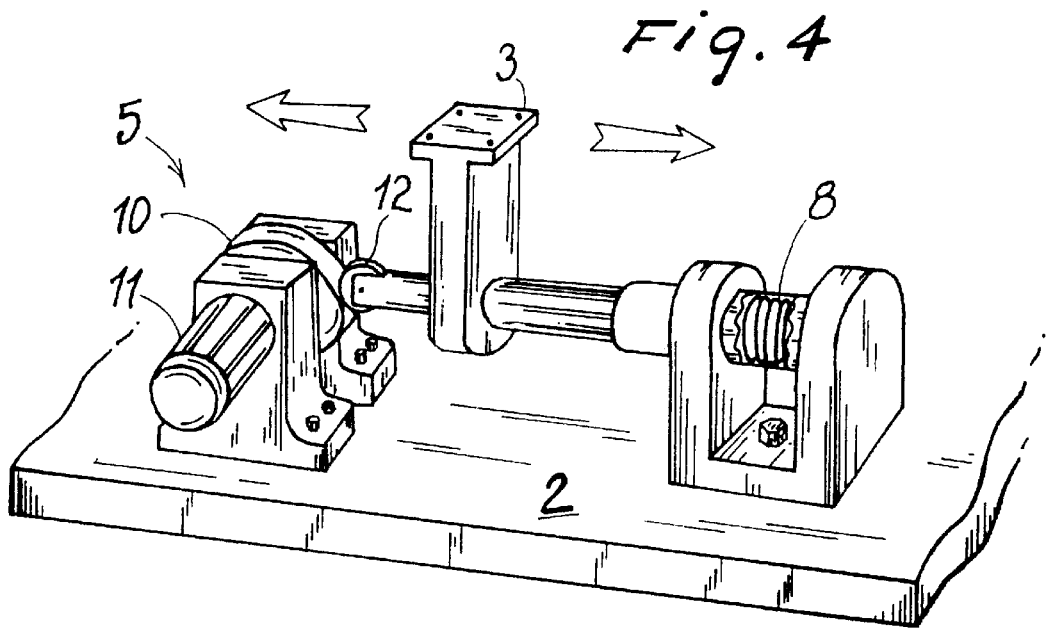
Fig. 4
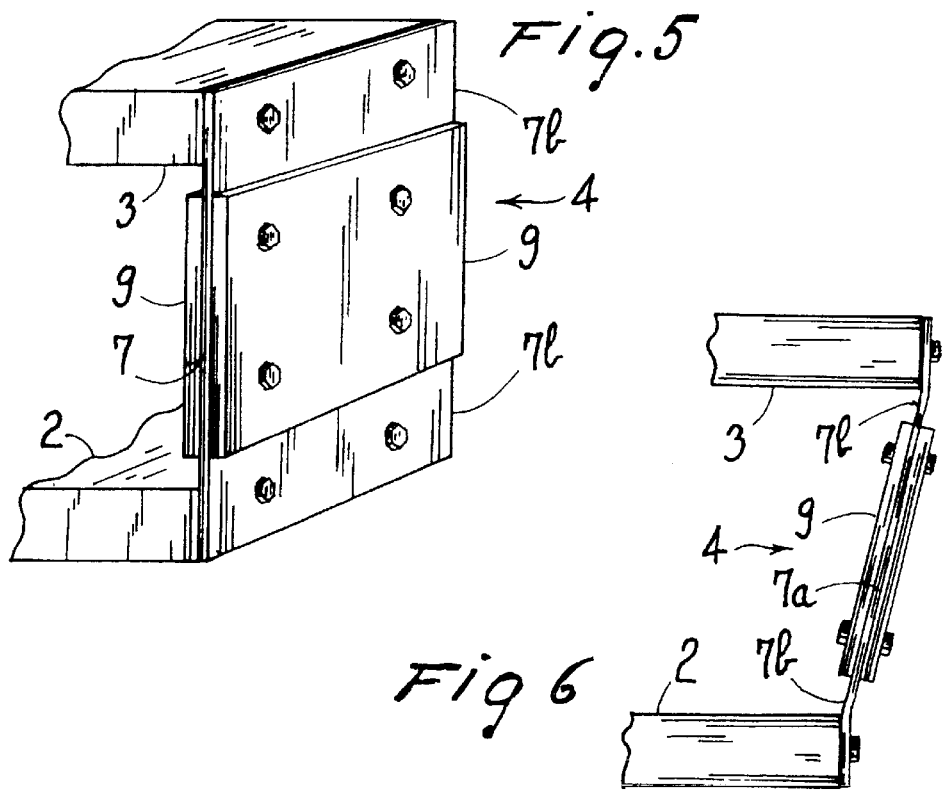
Fig. 5
Fig 6

GUIDE AND SUPPORT DEVICE FOR SMALL MACHINE TOOLS, IN PARTICULAR FOR ROTATING-MASS BALANCING MACHINES

FIELD OF THE INVENTION

The invention relates to a support and guide device for small machine tools, in particular for rotating-mass balancing machines, of the type comprising a base element, at least one moving element in engagement with the base element, support means for the moving element, and drive members controlling shifting of the moving element.

DESCRIPTION OF THE PRIOR ART

It is known that all machine tools are provided, in addition to a work or cutting motion, with an advance or feed motion causing relative shiftings between the tool and the workpiece.

These relative shiftings take place following a great variety of modalities and among other things involve use of different mechanical members for support and guide. For instance, generally used are slides that, as known, are supports provided with guides and movable along predetermined directions.

Depending on the situations, slides can movably support the workpiece or the tool and each slide is provided for carrying out shifting in a given direction. Slides are important and expensive components in machine tools because accuracy in workings also relies on stability and movement precision of same and because often very precise workings are required.

For instance, in milling machines used as balancing machines for rotating masses, accuracy in the relative shiftings between tool and workpiece must be rather high: in the order of one hundredth of a millimeter.

Balancing machines intervene in some rotors, such as armatures of small electric motors used in cars, household electrical appliances, electrical tooling, to remove small amounts of material at each balancing plane.

In order to achieve a final true accuracy of one or two hundredths of one millimeter in these balancing machines, slides therein used are relatively complicated and expensive, even if traditional in themselves.

Typically, in the concerned slides it is provided that at least two guides with at least two or four ball runners, one ballscrew with the related supports and bearings, a servomotor operating it and limit sensors, should be mounted on a base. The final cost of these controlled-motion slides is high and setting of same is also very demanding and expensive.

The foregoing is valid in spite of the fact that in this specific case the requested relative shiftings between the workpiece to be balanced during working and the milling tool are of minimum amount.

In fact, as already pointed out, material removal is very reduced and the maximum length of a single milling operation to balance a rotor can be quantified in an amount of about fifteen millimeters.

In addition, a maximum milling depth in a balancing machine is in the order of only three millimeters, although in order to cover the wide variety of diameters of the different pieces that may be submitted to working, an overall maximum stroke of about forty millimeters in the approaching direction between milling tool and rotor is to be stated.

In short, the present art teaches how to manufacture support and guide devices for machine tools having a structure that takes into account the amount of the shiftings to be made only as a marginal question and that, if precision shiftings are required, needs complicated and expensive devices.

This hinders diffusion of small precision machine tools, in particular of said balancing machines.

SUMMARY OF THE INVENTION

Under this situation the technical task of the present invention is to conceive a support and guide device capable of obviating the mentioned drawbacks. Within the scope of this technical task it is an important aim of the invention to conceive a device particularly adapted for small shiftings in small machine tools and capable of enabling both high accuracy and minimum costs.

Another important aim of the invention is to conceive a device of simple structure, formed of a minimum number of pieces and of reliable operation.

The technical task mentioned and the aims specified are achieved by a support and guide device for small machine tools, in particular for rotating-mass balancing machines, comprising: a base element, at least one moving element in engagement with said base element, support means for said moving element, and drive members for controlling shifting of same, said support means comprising at least one elastically deformable thin sheet oscillatably supporting said moving element.

BRIEF DESCRIPTION OF THE DRAWINGS

Description of some embodiments of the device of the invention is now given hereinafter, with reference to the accompanying drawings, in which:

FIG. 1 shows the device arranged for shiftings of the horizontal type;

FIG. 2 shows the device in FIG. 1 arranged for shiftings of the vertical type;

FIG. 3 shows a device consisting of the sum of the structures shown in the preceding two figures, so as to obtain shiftings both in the horizontal and in the vertical direction;

FIG. 4 is a perspective view of a portion in FIG. 1;

FIGS. 5 and 6 show an elastic thin sheet of the embodiment in FIG. 1 in a rest position and in an elastically deformed position, respectively;

DESCRIPTION OF THE PREFERRED EMBODIMENTS

Figure 7:
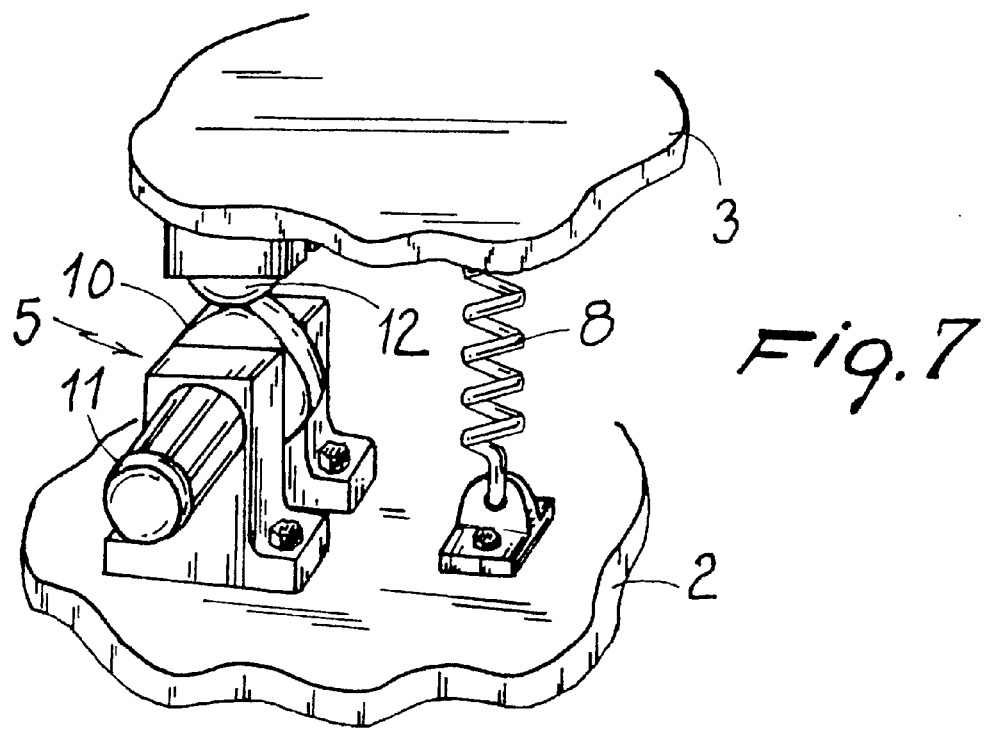
FIG. 7 is a perspective view of a portion in FIG. 2.
Figure 8:
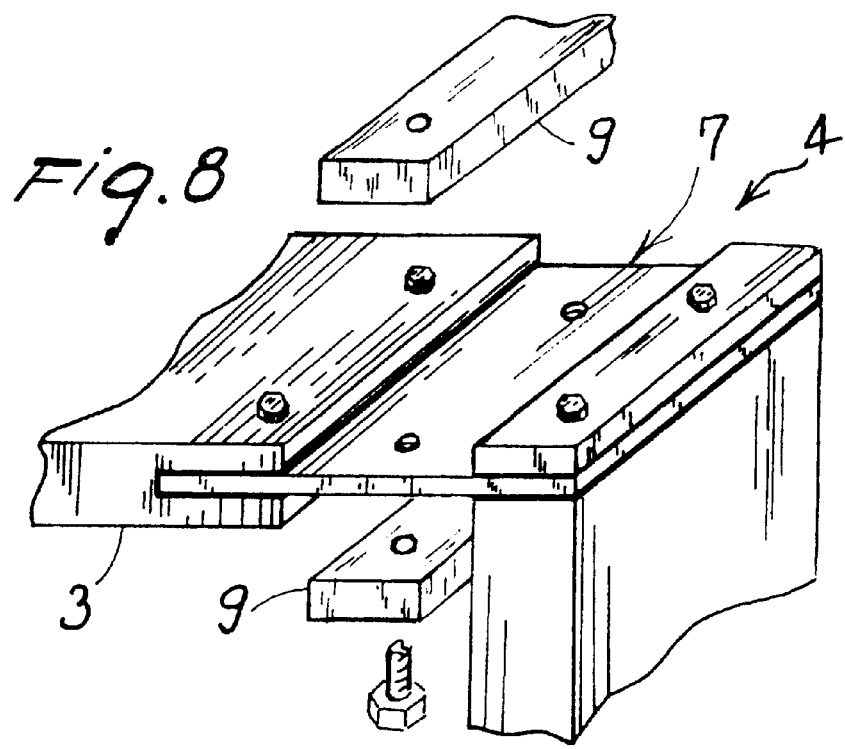
FIG. 8 shows an elastic thin sheet of the embodiment in FIG. 2, in a rest position.

With reference to the drawings, the device of the invention has been identified by reference numeral 1.

It generally comprises a base element 2, at least one moving element 3 in engagement with the base element 2 and shiftable relative to the latter, and support means 4 for shiftings of the moving element 3.

Also provided are drive members 5 controlling shiftings of each moving element 3 relative to the base element 2.

The base element 2 in the simplest embodiment is the base of a small machine tool, whereas the moving element 3 is the support of operating members of the machine tool itself.

In the preferred instance of small machine tools such as small milling machines for balancing rotors, elements 2 and 3 are plate-like bodies of rectangular shapes seen in plan view and of a bulkiness involving sides of some ten centimeters.

The moving element 3, at least at a suitably-positioned work region is in engagement with at least one attachment piece 6 or support for the tool to be used. For instance, the moving element 3 has an attachment piece 6 at one end thereof. The attachment piece 6 can be embodied by supports with bearings for a milling spindle.

The support means 4 of the moving element 3 comprises at least one elastically deformable thin sheet element 7 which engages the moving element 3 like an oscillatable support wall.

The thin sheets 7 extend at the ends of elements 2 and 3, to which they are merely screwed up, and have a thickness of about one or two millimeters, for example.

Each elastically deformable thin sheet 7 is substantially flat in a rest condition and is preferably made of high-tensile steel, or spring steel, in order to ensure the greatest flexibility and strength.

The thin sheet sizes are imposed by the overall structure of the machine tools: for instance, the thin sheets 7 have square or rectangular shapes and maximum linear sizes in the order of about ten centimeters.

Control of elasticity of the thin sheets 7 is obtained, once thickness has been established, by applying rigid stiffening plates 9 fastened by bolting and sandwiching the thin sheets 7 on opposite sides.

In addition, the stiffening plates 9 preferably engage a median portion of the thin sheets 7 so as to form flexibility regions spaced apart from each other. Practically, for each thin sheet 7 two stiffening plates 9 in contact with opposite faces of the thin sheet 7 are provided so as to sandwich and stiffen a first central region 7a of each thin sheet.

The first region 7a has smaller sizes than those of the thin sheet 7: free regions 7b adjacent the first region 7a and spaced apart from each other are always present to ensure the necessary elasticity. Said elasticity is thus proportionate to the width of the second free regions 7b and can therefore be adjusted at will by giving appropriate sizes to the stiffening plates 9. Obviously the stiffening plates 9 can be positioned on the thin sheets 7 no matter how and even omitted when the device is formed with thin sheets 7 of very reduced sizes or the elasticity of which is already adjusted based on the particular needs.

The device can be made for carrying out shiftings—between the base element 2 and the moving element 3—parallel or transverse to each other, or preferably in both directions simultaneously.

In the first case shown in FIG. 1, the base and moving elements, 2 and 3, define a four-bar linkage together with the support means 4.

In the second case shown in FIG. 2, the moving element together with the related support means 4 defines a bracket body provided with a tilting motion with respect to the base element 2 and having an attachment piece 6 at its free end. In fact, as shown in FIG. 2, the sheet element 7 extends in a direction substantially parallel to the moving element 3 at one end thereof, and the drive members 5 act on the moving element 3 in a direction substantially transverse to the moving element 3 at a portion spaced from said end. In particular, the technical solution in FIG. 2, where the stiffening plates 9 only consist of strips, can be simplified by omitting the stiffening plates 9 and suitably reducing the available space for the thin sheet element 7.

In the third case, which is the sum of the preceding two cases and is shown in FIG. 3, two moving elements 3 are mounted in overlying relationship on a single base element 2, i.e. a first moving element 3a forming a fourbar linkage with the underlying base element 2 and a second moving element 3b overlying the first moving element and the base element 2 so as to form a body in the form of a bracket. As shown, a first and a second drive member respectively act on the first and the second moving element 3a, 3b, so causing shifting of the moving elements 3a, 3b selectively according to directions substantially perpendicular to each other.

It is also pointed out that the drive members 5 are preferably fitted between a moving element 3 and the base element 2 and they directly act on the moving element 3.

In other words, the drive members 5 do not act on the support means 4 but directly on the moving elements 3 so that they operate with the greatest accuracy without intermediate members.

In detail, the drive members 5 comprise a motor, preferably an electric motor, and a connecting rod-crank mechanism or a cam-cam follower assembly operated by the motor.

Where a motor operates a connecting rod-crank mechanism, the connecting rod is in engagement with a moving element 3 and the crank is supported by a respective base element 2.

In the preferred case of a motor operating a cam-cam follower assembly, as shown in the figures, provision is made for a cam 10 which has a rotation axis 10a substantially parallel to the base element 2, an electric motor 11 adapted to rotate the cam 10 and coaxial with the rotation axis 10a, and a cam follower 12 engaging the cam 10 by acting against the action of same.

The cam follower 12 consists of a roller linked to a moving element 3, and the cam is linked to the underlying element.

To enable horizontal shiftings, in FIG. 1 the cam follower 12 is substantially at the same height as the rotation axis 10a of cam 10, whereas to enable vertical shiftings, in FIG. 2, the cam follower 12 is substantially above the rotation axis 10a. Also provided are helical springs 8 active on each moving element 3 and interposed between the moving element 3 and the underlying element, so as to keep the cam followers 12 at a position at which they closely counteract the action of cam 10. In the case shown in FIG. 1 compression springs are present and in the case shown in FIG. 2 draw-springs are present.

Since the drive members 5 are also active against the action of the elastically deformable thin sheets 7, springs 8 can optionally be omitted. Cam 10 can also be of a type having one degree of freedom only and therefore directly connected with the cam follower 12, by a shaped groove in which the cam follower runs, for example. In this way the helical springs 8 are not required. In fact in the last-mentioned case a complete-constraint system is concerned, with only one degree of freedom as said, like the already discussed connecting rod-crank mechanism.

The electric motor 11 is preferably of the brushless type and it is provided adapted to angularly position the cam 10 in a very precise manner.

Operation of the device is as follows.

The device is placed at the base of small machine tools for which relative shiftings of small amount between the workpiece and the tool are required. As already pointed out, in small balancing machines operating by material removal, these shiftings are of about fifteen millimeters in a horizontal direction and forty millimeters in a vertical direction.

Shiftings of the moving element or upper plate-like body 3 are obtained by starting the electric motor 11 and therefore starting the connecting rod-crank mechanism or the cam-cam follower assembly.

For instance, with a cam-cam follower assembly of the type shown, cam 10 can impose small shiftings to the cam follower 12 and therefore to the moving element 3, since cam 10 is in engagement with the base element 2 and the cam follower 12 is directly in engagement with the moving element 3, in turn supported by one or more thin sheets 7 in an oscillatable manner.

The thin sheets 7 perform different functions, i.e. they act as a support for the moving element 3, as a moving guide for the same, and as a stabilising elastic member active against the action of the drive members 5.

As a support element they must have sufficient dimensions to place the moving element 3 at correctly raised positions and as a guide element they must have wide dimensions, so as to enable the moving element 3 itself to carry out shiftings of sufficient width.

In addition, should a four-bar linkage be formed as in FIG. 1, the relatively wide sizes enable the intended longitudinal shiftings to be achieved without an important lowering in the vertical direction.

The above can possibly lead to an excessive flexibility and yielding in the vertical direction, but this drawback is completely overcome and obviated by arranging sandwiching stiffening plates 9 on the thin sheets 7.

Said stiffening plates limit the thin sheet yielding in a simple and efficient manner, even in the presence of important weights and of thin sheets of very reduced thickness, and in addition they stiffen the thin sheets themselves to such an extent that, on deflection, a sufficiently high elastic reaction is obtained.

The invention achieves important advantages.

In fact, a device of very simple structure and low cost has been obtained which enables achievement of small and highly-precise shiftings.

Accuracy is in particular connected with the direct control of the moving elements and the substantial absence of plays.

The support means 4 and drive members 5 by themselves enable shiftings having an accuracy in the order of thousandths of a millimeter.

In addition, the device, due to the presence of the stiffening plates 9 is very versatile, cheap and of easy setting in fact, one and the same elastic thin sheet can take different elasticity values that can be adjusted with great accuracy, and also thin sheets of very reduced thickness and wide sizes can be utilized.

What is claimed is:

1. A support and guide device for machine tools, comprising:
   a base element,
   at least one moving element being offset from the base element in a first direction and extending substantially parallel to the base element in a second direction substantially perpendicular to the first direction and being adapted to support a tool,
   support means between said base element and said at least one moving element for movably supporting said at least one moving element,
   drive members for controlling shifting of said at least one moving element relative to said base element,
   wherein said support means comprise at least one elastically deformable sheet element oscillatably supporting said at least one moving element, said at least one sheet element extending in the second direction and being located at one end of the at least one moving element, and wherein the drive members act to move said at least one moving element in the first direction at a portion thereof spaced from said one end.

2. A device as claimed in claim 1, wherein said support means further comprise a pair of stiffening plates sandwiching a first region of said at least one sheet element, and wherein said at least one sheet element comprises second regions adjacent said first region and free from said stiffening plates, whereby the elasticity of said at least one sheet element is substantially proportional to the extent of said second regions.

3. A device as claimed in claim 1, further comprising at least one spring interposed between said at least one moving element and said base element for holding said at least one moving element in engagement with said drive members.

4. A device as claimed in claim 1, wherein said drive members comprise a motor and a cam-follower assembly operated by said motor, the cam follower being directly in engagement with said at least one moving element.

5. A device as claimed in claim 1, wherein said drive members are arranged between said base element and said at least one moving element.

6. A device as claimed in claim 1, wherein said at least one moving element comprises a first moving element and a second moving element arranged in overlying relationship, and said at least one elastically deformable sheet element comprises a plurality of elastically deformable sheet elements, said first moving element extending in said second direction and being oscillatably supported by a pair of said elastically deformable sheet elements extending in said first direction and spaced apart from one another, said pair of sheet elements each having one end fastened to said base element and another end fastened to a respective end of said first moving element, said second moving element extending in said second direction and being oscillatably supported by one of said elastically deformable sheet elements extending in said second direction and fastened to a support member for supporting a tool rigid with said first moving element, and wherein said drive members comprise a first drive member arranged to act on said first moving element and a second drive member arranged to act on said second moving element, said first and second drive members being actuatable selectively to cause shifting of said first and second moving elements selectively according to directions substantially perpendicular to one another.

7. A device as claimed in claim 6, wherein said first drive member is arranged between said base element and said first moving element, and wherein said second drive member is arranged between said first moving element and said second moving element.

* * * * *